(12) United States Patent
Winger et al.

(10) Patent No.: US 7,830,964 B2
(45) Date of Patent: Nov. 9, 2010

(54) METHOD AND/OR APPARATUS FOR PARSING COMPRESSED VIDEO BITSTREAMS

(75) Inventors: Lowell L. Winger, Waterloo (CA); Eric C. Pearson, Conestogo (CA)

(73) Assignee: LSI Corporation, Milpitas, CA (US)

( * ) Notice: Subject to any disclaimer, the term of this patent is extended or adjusted under 35 U.S.C. 154(b) by 1156 days.

(21) Appl. No.: 10/997,006

(22) Filed: Nov. 24, 2004

(65) Prior Publication Data

US 2006/0109912 A1    May 25, 2006

(51) Int. Cl.
*H04N 7/12* (2006.01)
*G06K 9/46* (2006.01)

(52) U.S. Cl. .................................. 375/240.23; 382/246
(58) Field of Classification Search ............ 375/240.23; 382/246

See application file for complete search history.

(56) References Cited

U.S. PATENT DOCUMENTS

| 5,841,380 | A | * | 11/1998 | Sita et al. ....................... 341/67 |
| 6,646,578 | B1 | * | 11/2003 | Au ............................... 341/67 |
| 2005/0135691 | A1 | * | 6/2005 | Reese ........................... 382/246 |

\* cited by examiner

*Primary Examiner*—Y. Lee
*Assistant Examiner*—Richard Torrente
(74) *Attorney, Agent, or Firm*—Christopher P. Maiorana, PC

(57) ABSTRACT

An apparatus including a parsing circuit and a control circuit. The parsing circuit may be configured to generate a plurality of decoded syntax elements in response to (i) a serial bitstream and (ii) a control signal. The control circuit may be configured to generate the control signal in response to the plurality of decoded syntax elements. The parsing circuit may generate the plurality of decoded syntax elements by grouping syntax elements for atomic decoding such that each (i) one or more consecutive syntax elements without context information relevant to the decoding and (ii) a non-zero syntax element presented at the end of each group.

18 Claims, 3 Drawing Sheets

METHOD AND/OR APPARATUS FOR PARSING COMPRESSED VIDEO BITSTREAMS

FIELD OF THE INVENTION

The present invention relates to video processing generally and, more particularly, to a method and/or apparatus for parsing compressed video bitstreams.

BACKGROUND OF THE INVENTION

Many types of variable length codes have been designed to efficiently represent compressed video prediction residual coefficient values. Typically many coefficients in a block of coefficients will be zero-valued for a large number of compressed video bitstreams. Most compression methods use a syntax that separately represents non-zero coefficient values, and a count of a number of zero coefficients (typically, but not always, the number of zeros that precede the non-zero coefficient in coefficient scan order).

One type of compression uses separate one-dimensional variable length codes (1D-VLCs) that can be individually tuned to represent the expected statistics of coefficient values and/or zero-run-lengths.

Another type of compression uses two-dimensional variable length codes (2D-VLCs) that can jointly represent a non-zero coefficient value and a count for a number of zero coefficients. 2D-VLCs can be an efficient method to exploit the correlation between adjacent zero-run-lengths and coefficient values. 2D-VLCs may also make use of a specific symbol to signal an 'end-of-block' (i.e., when the last VLC for a block of coefficients has been transmitted) in order to specify all of the coefficient data in a block.

Another type of compression uses three-dimensional variable length codes (3D-VLCs) that can jointly encode, with a single code, 3 pieces of information (i) a non-zero coefficient value, (ii) a count value for a number of zero coefficients, and (iii) an end-of-block indicator.

The difficulty with 2D and 3D VLCs is that the tables/codes are often much larger and/or less regular than 1D VLCs. In order to use non-fixed (i.e., adaptive) VLC coding, multiple different VLC tables/codes are needed. If adaptivity is at a picture or slice of macroblocks level, then such switching may be practical. However, if the adaptivity is at the coefficient/pixel level, where switching between tables is based on previously encoded coefficient-values and/or run-lengths (i.e., the 'context' information for the adaptive codes), then the size/regularity of the tables/codes being switched may be impractical due to a high complexity/cost.

Furthermore, adaptive codes are often found to be more efficient than fixed codes due to their ability to adapt to the underlying statistics of the source. However, implementing 2D or 3D VLCs that are also coefficient/run-level adaptive has the disadvantage that the number and size of tables/codes often becomes unwieldy. In order to efficiently implement an encoder/decoder (CODEC), conventional approaches choose between obtaining the benefits of 2D/3D codes that explicitly exploit the correlation between zero-run-lengths and coefficient values, and the benefits of coefficient/run-level adaptive codes. The benefits of such coefficient-level adaptive codes have been found to be significant, such that the recent video coding standard H.264/MPEG-AVC has chosen to use adaptive 1D coefficient-level adaptive codes for VLC-based coefficient residual coding. H.264/MPEG-AVC refers to such codes as context adaptive variable length code (CAVLC).

A typical VLC CODEC unit will contain an interface to a block of residual coefficients. For example, a VLC encoder unit will take a block of residual coefficients and output to a bitstream the syntax that represents them. Conversely, a VLC decoder unit will input (i.e., parse) sufficient syntax from a bitstream to output a block of residual coefficients. A hierarchy of interfaces may exist. A typical upwards hierarchy would include interfaces for parsing/encoding (i) a block, (ii) an entire macroblock (several blocks), (iii) a slice (several macroblocks), and (iv) a picture (several slices). Since the bitstream syntax is hierarchical, it is natural to design a VLC CODEC having a similar hierarchy.

A typical downward hierarchy (from the block level) could be (i) a block, (ii) individual coefficient values, and (iii) the individual syntax elements that compose a block. A significant problem is choosing an interface for the lowest level of the hierarchy.

Typically video coding standards demand that compliant devices be capable of processing a specified number of macroblocks per second (or other appropriate time interval). Each unit of a parallel or pipelined device (e.g., the VLC CODEC unit) must be capable of also processing a specified number of macroblocks per second. Synchronous devices have specified clock rates, so this may alternatively be specified as a requirement that the VLC CODEC unit process a certain number of macroblocks in a certain number of cycles.

High-performance VLC CODEC units often operate within a pipelined architecture where each unit processes a small integer number of macroblocks in a specified number of cycles. For example, a limit on number of motion vectors per macroblock pair in the H.264/MPEG4-AVC standard is specifically intended to limit the complexity/cost of a pipelined memory architecture designed for macroblock pairs.

When possible, it is desirable to extend the hierarchy of design to a lower level. For example, specific units in a pipelined design should be able to process a single macroblock in a specified number of cycles, a single block in a specified number of cycles, or individual syntax elements in a specified number of cycles.

With a 2D or 3D-VLC CODEC unit, if each VLC CODEC is parsed/encoded in a fixed (N) number of cycles (e.g., N=1 cycle per code) by a device, then a small upper limit is naturally imposed on the maximum number of cycles needed by the unit to process the coefficient data contained in next level in the hierarchy (i.e., a 4×4 or 8×8 block). Typically a 4×4 block of coefficients would have an upper limit (imposed by the syntax) of 16*N or 17*N 3D or 2D VLC codes per block for processing the coefficients. In the same manner, a 16×16 macroblock would then have an upper limit of not significantly more than 256*N cycles for parsing/encoding just the coefficient data.

In many implementations of a VLC encoding or decoding module, each syntax element (bitstream code that represents a quantity such as a zero-run-length, or a coefficient value) will be parsed in a single cycle. The problem with such a conventional solution is that while existing widely-deployed standards (such as MPEG-2/H.262) do not typically use significantly more than a single VLC per coefficient to represent a block of residual-coefficients, MPEG-4 AVC/H.264 uses multiple codes per coefficient, and separates the VLCs representing the coefficients values from the VLCs representing the zero-run-lengths in the bitstream for each individual block.

Conventional solutions use at most N cycles per each VLC code for coefficient data, and would typically parse one VLC and/or one coefficient per cycle. With the H.264/MPEG4-AVC CAVLC all of the VLCs/syntax-elements representing non-zero coefficient values for a 4×4 block precede, in the bitstream, all of the VLCs/syntax-elements representing the run-length encoded zero-valued coefficient values (and the positions in scan order of all of the coefficients).

In this way, all of the non-zero coefficients are parsed/encoded before all of the coefficient positioning information can be parsed/encoded with H.264/MPEG4-AVC. This is in contrast to previous/legacy standards for which non-zero coefficient values and their position (e.g., preceding zero-coefficient runlength) are coded immediately adjacent to each other in the bitstream.

For this reason, a conventional interface would need a fixed number of cycles (e.g., 1) be used for parsing each coefficient value and also that a second fixed number of cycles be used for parsing each zero-runlength).

The disadvantage of such a solution is that if an interface is to run in the smallest possible number of cycles (e.g., 1) then the maximum number of cycles to parse a block becomes two-times that which would have been needed for traditional/legacy bitstreams in which the coefficient values and positions were either jointly encoded in the bitstream or at least adjacent (if encoded with separate 1D VLCs) such that both the value and the position of a coefficient could be processed at the same time.

It would be desirable to implement a method and/or apparatus for parsing compressed video bitstreams that does not increase processing overhead more than compared with a 1D VLC.

SUMMARY OF THE INVENTION

The present invention concerns an apparatus comprising a parsing circuit and a control circuit. The parsing circuit may be configured to generate a plurality of decoded syntax elements in response to (i) a serial bitstream and (ii) a control signal. The control circuit may be configured to generate the control signal in response to the plurality of decoded syntax elements. The parsing circuit may generate the plurality of decoded syntax elements by grouping syntax elements for atomic decoding such that each group comprises (i) one or more consecutive syntax elements without context information relevant to the decoding and (ii) a non-zero syntax element presented at the end of each group.

The objects, features and advantages of the present invention include providing a method and/or apparatus for parsing compressed video bitstreams that may (i) be implemented with efficient use of resources and/or (ii) parse a more complicated bitstream with a comparable number of cycles.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
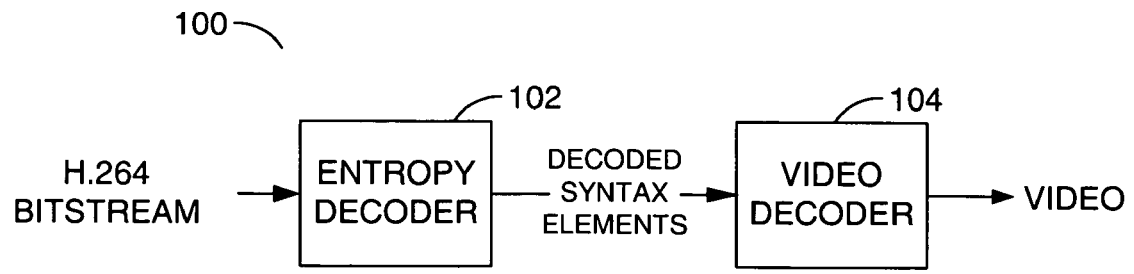
FIG. 1 is a diagram of a video decoder.

Referring to FIG. 1, a diagram of a circuit 100 showing an implementation of a video decoder is shown. In on example, the decoder may be implemented as an H.264 compliant video decoder. The circuit 100 comprises an entropy decoder 102 and a video decoder 104. The entropy decoder 102 generally receives an H.264 bitstream and presents a series of decoded syntax elements to the video decoder 104. The video decoder 104 presents a signal (e.g., VIDEO).

Figure 2:
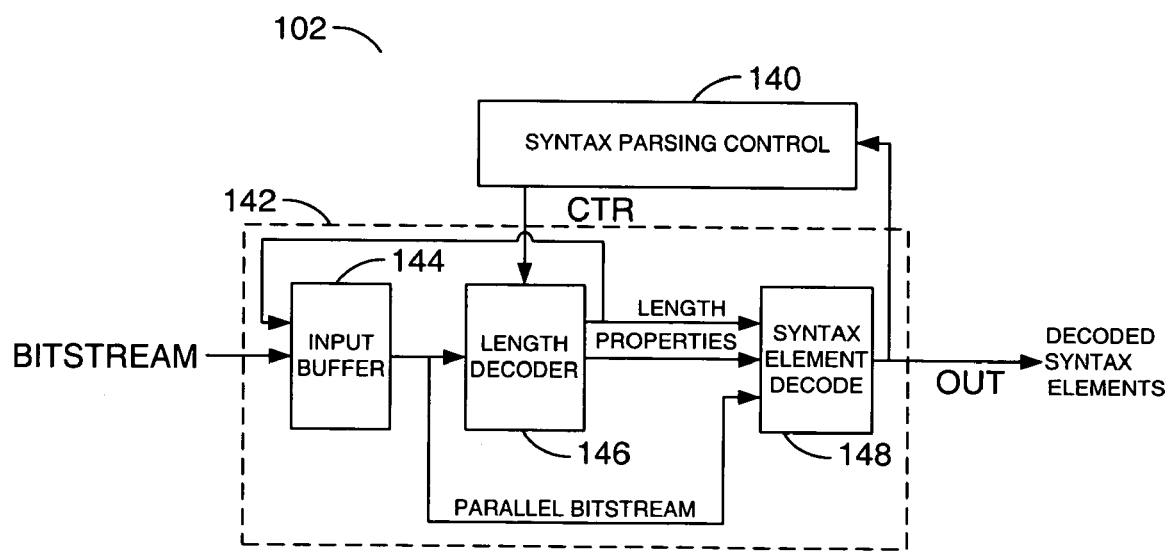
FIG. 2 is a diagram of an entropy decoder in accordance with a preferred embodiment of the present invention.

Referring to FIG. 2, a more detailed diagram of the circuit 102 is shown. The circuit 102 generally comprises block (or circuit) 140 and a block (or circuit) 142. The circuit 142 generally comprises a block (or circuit) 144, a block (or circuit) 146, and a block (or circuit) 148. The circuit 140 may be implemented as a syntax parsing control circuit. The circuit 142 may be implemented as a syntax element parsing and decoding circuit. The circuit 144 may be implemented as an input buffer. The circuit 146 may be implemented as a length decoder. The circuit 148 may be implemented as a syntax element decoder.

The input buffer 144 generally receives a signal (e.g., BITSTREAM). The signal BITSTREAM may be implemented as a serial bitstream. In one example, the signal BITSTREAM may comprise an H.264 bitstream. However, other bitstreams may be implemented to meet the design criteria of a particular implementation. The input buffer 144 presents a signal (e.g., PARALLEL BITSTREAM) to the length decoder 146, as well as to the syntax element decoder 148. The length decoder 146 presents a signal (e.g., LENGTH) and a signal (e.g., PROPERTIES) to the syntax element decoder 148. The signal LENGTH is also presented to the input buffer 144. The syntax element decoder 148 presents a signal (e.g., OUT). The signal OUT may represent decoded syntax elements. The signal OUT is presented to additional circuitry, as well as to the syntax parsing control circuit 142. The syntax parsing control circuit 140 also presents a control signal (e.g., CTR) to the length decoder 146.

Figure 3:
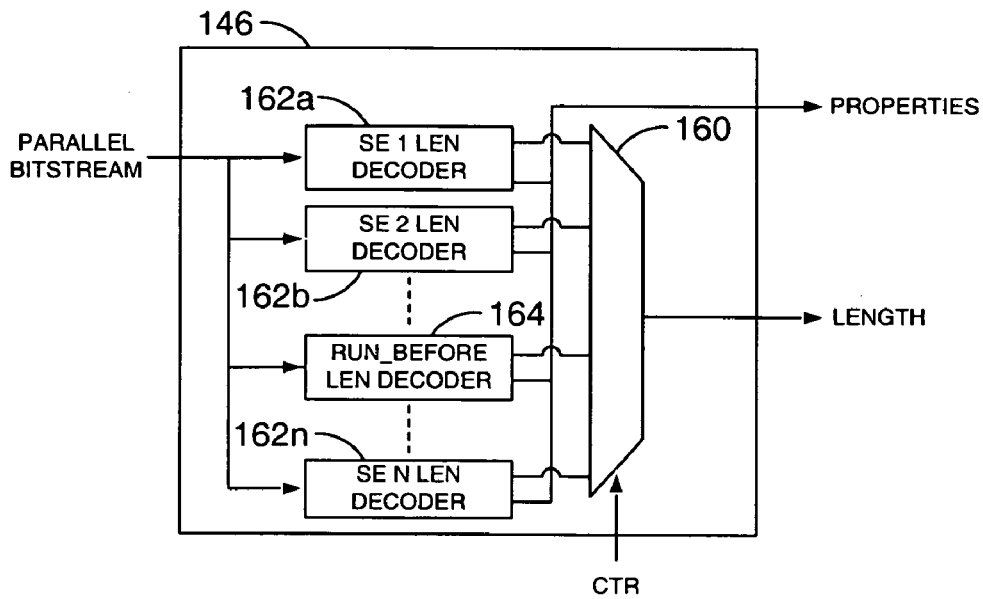
FIG. 3 is a diagram of a syntax element length decoder in accordance with a preferred embodiment of the present invention.

Referring to FIG. 3, a more detailed diagram of the length decoder 146 is shown. The length decoder 146 generally comprises a multiplexer 160, a number of length decoders 162a-162n and a run before length decoder 164. Each of the decoders 162a-162n and 164 presents a signal to the multiplexer 160. The multiplexer 160 generates the signal LENGTH in response to the signal CTR. The signal PROPERTIES is presented in response to a second output of each of the decoders 162a-166.

Figure 4:
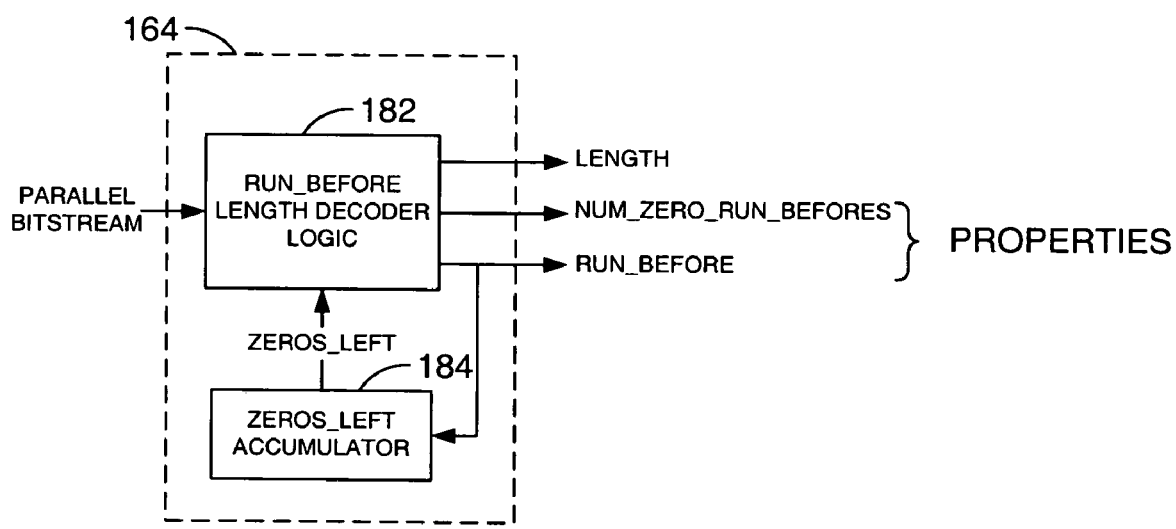
FIG. 4 is a more detailed diagram of a run-before syntax element length decoder of FIG. 3.

Referring to FIG. 4, a more detailed diagram of a circuit 164 is shown. The circuit 164 generally comprises a block (or circuit) 182 and a block (or circuit) 184. The circuit 182 presents the signal LENGTH, a signal (e.g., number of zeros before_run) and a signal (e.g., run_before). The signals num_zero_run_before and run_before generally comprise components of the signal PROPERTIES. The circuit 164 receives the signal PARALLEL BITSTREAM.

Figure 5:
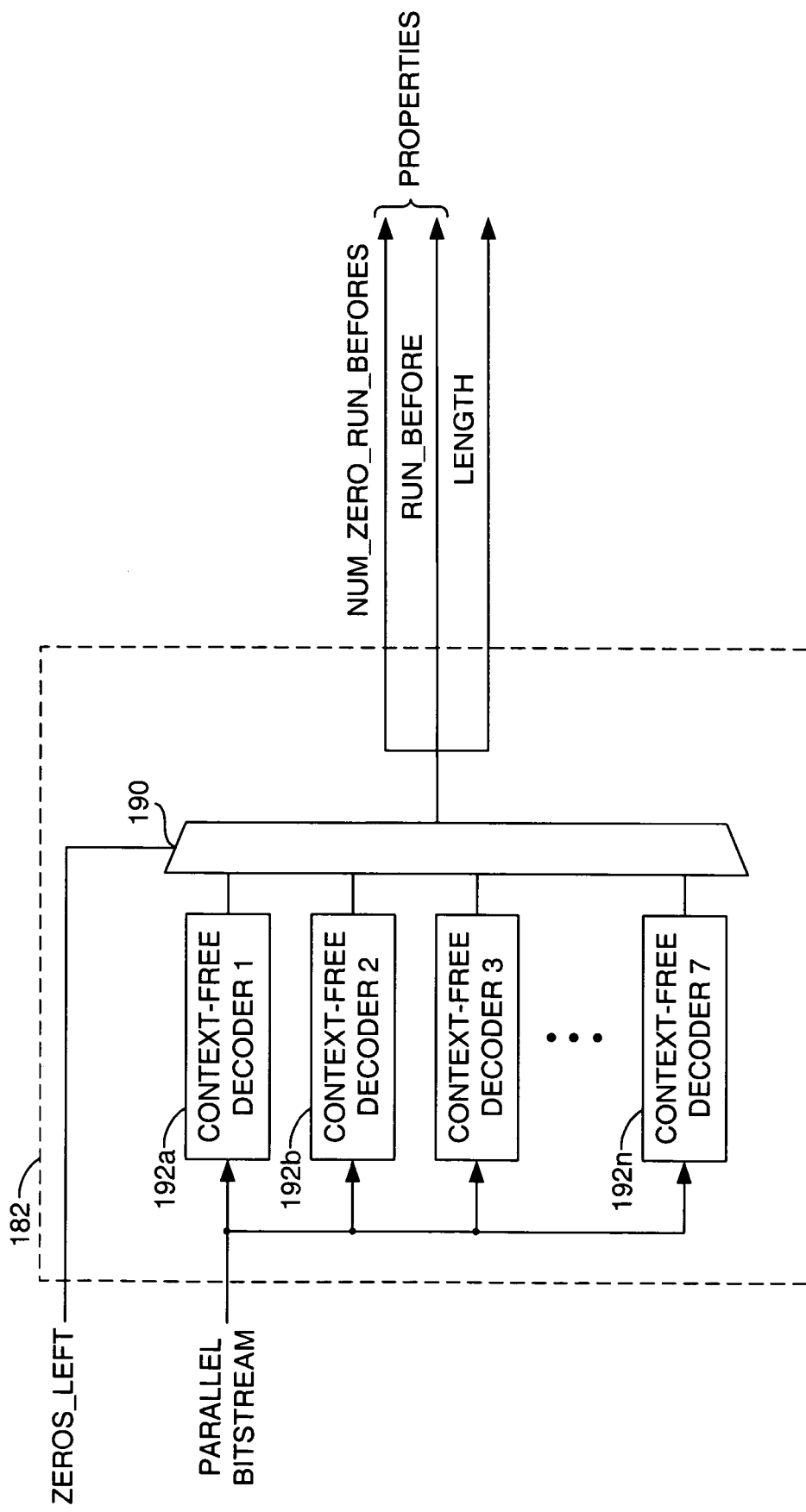
FIG. 5 is a more detailed diagram of the run before length decode logic of FIG. 3.

Referring to FIG. 5, a more detailed diagram of a circuit 182 is shown. The circuit 182 generally comprises a multiplexer 190, a number of context free decoders 192a-192n. The multiplexer 190 presents the signals RUN_BEFORE, and NUM_ZERO_RUN_BEFORES and LENGTH. The signal ZEROS_LEFT controls the switch choice of which of the context-free decoders 192a-192n is used for looking up the value of the signal RUN_BEFORE and the signal LENGTH using the input from the signal BITSTREAM. While the circuits 192a-102n may be implemented as a "table look-up", the present invention may be used by a software decoder, a hardware decoder, or a combination of hardware and software. Additionally, priority decoders and/or other circuitry may be implemented to reduce cost and/or complexity. While 7 tables (e.g., the context-free decoders 192a-192n) are illustrated, the particular number of tables may be increased or decreased to meet the design criteria of a particular implementation. Furthermore, the switch 190 and the multiple context-free decoders 192a-192n may be replaced with a single decoder/table look-up. In particular, explicit switching between 7 separate tables is shown for conceptual clarity. The tables do not necessarily need to be implemented separately.

In one example, the circuit 182 may be configured for H.264 syntax elements. There are 7 different context adaptive VLC tables for H.264/MPEG4-AVC used to represent the runs of zeros (e.g., the 'run_before' syntax elements). The tables are switched based upon the signal ZEROS_LEFT. The signal ZEROS_LEFT generally represents the 'number of zero-coefficients left' to be processed in a particular block. A transition to a new table will only occur after a non-zero 'run_before' syntax element is decoded (a zero-valued run_before indicates that no zero-coefficients preceded the current non-zero valued coefficient, so the number of zero-coefficients left is unchanged). For the case where run_before=0, the VLC table will not be changed before the processing of the next run_before syntax-element.

If a block has M (e.g., 16) coefficients, and the total number of non-zero coefficients is A, then the total number of run_before=0 elements is also A. Since no table switch occurs after a run_before=0 element, the computational resources for processing such syntax elements may be significantly reduced. An interface may be implemented for decoding the run_before syntax elements that indicates a number (between 0 and 16) representing the number-of-zero-run_befores and an-adjacent-nonzero-run_before-value, and to make this interface run at the atomic number of cycles (e.g., N=1 cycle). In contrast, a traditional interface used for parsing/encoding the non-zero-valued coefficient-values needs N*A cycles to process such a block.

The present invention takes advantage of the nature of the VLC table adaptation in H.264/MPEG4-AVC. The number of non-zero-coefficients (which are represented in the syntax) and the number of non-zero run_before syntax elements sum together to equal a fixed number (which is the total number of coefficients in a block). An interface for parsing a block of coefficients using the present invention generally enables the parsing of a block of H.264/MPEG4-AVC residual coefficient syntax elements in the same number of cycles as the parsing of a traditional block of residual coefficient syntax elements. The same number of cycles are used even though H.264/MPEG4-AVC coefficient-values and zero-run-lengths are separately represented in the bitstream. In particular, all of the non-zero coefficient values precede in the bitstream all of the zero-run-length information. In traditional/legacy standards, the coefficient values and positions would be adjacent in the bitstream (e.g., using only a straight-forward interface of coefficient values or alternatively a straight-forward interface of coefficient-values-and-adjacent zero-run-length).

The parsing circuit 140 uses two quantities (i) the number-of-zero-run_befores and (ii) an-adjacent-nonzero-run_before-value returned from the unit (circuit 164) that processes run_before syntax elements. The circuit 140 (at most) uses N*(M−A) cycles to process this block (N times the number of non-zero run_before syntax elements). The syntax elements are grouped such that each group comprises (i) one or more consecutive syntax elements without context information relevant to the decoding and (ii) a non-zero syntax element presented at the end of each group. Each group comprises either (i) one non-zero syntax element or (ii) no non-zero syntax elements.

In particular, the circuit 140 specifies a pair of interfaces running at an atomic number of cycles (N) each. When taken together for a block of coefficients processes, the block in a worst case number of cycles (N*M) is the same as the worst case number of cycles that would be used for parsing a legacy blocking using the simpler VLCs of legacy standards (MPEG-2, etc.). In contrast, a conventional interface would have used up to N cycles for each coefficient values and an additional N cycles for each zero-run length (run_before) (i.e., a conventional interface uses double the number of cycles–2*(N*M) cycles).

In general the circuit 140 applies to the processing of the bitstream syntax for any video coding, still picture coding standard, and/or audio coding standard (i.e., any block-based transform compression standard) in which the syntax elements for non-zero coefficients are separated (i.e., not adjacent in the bitstream) from the syntax elements of the adjacent (in coefficient scan order) zero-run-lengths. The invention takes advantage of the fact that the sum of the number of non-zero-coefficients with the number of non-zero-run-lengths less than or equal to the total number of coefficients, to achieve an efficient interface for the VLC CODEC unit.

If the runlengths and coefficient values are represented in an adjacent manner in the bitstream then the zero-valued runlength may be implicit from the order of the syntax elements (as it is with MPEG2, etc.). If the runlengths are not adjacent, then the position of the non-zero-coefficients gets communicated in an alternative fashion (e.g., by explicitly representing the position of the zero-length runlengths and the invention applies).

The present invention may work even better in cases where the parsing of zero-valued zero-runlengths is particularly simple and straightforward (e.g., with H.264/MPEG4-AVC due to the absence of adaptive table switching in this particular case). The reason that this is advantageous is that it is reasonable in such a case to process a large number of zero-valued zero-runlength values in a single atomic operation.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a parsing circuit having a first input receiving a serial bitstream, a second input receiving a control signal and an output presenting a plurality of decoded syntax elements, said parsing circuit configured to generate said plurality of decoded syntax elements in response to (i) said serial bitstream and (ii) said control signal, wherein said parsing circuit comprises (a) an input circuit configured to generate a parallel bitstream in response to said serial bitstream and a first intermediate signal and (b) a first decoder configured to generate said first intermediate signal, a second intermediate signal and a third intermediate signal in response to said parallel bitstream and said control signal, wherein said first decoder includes a run before decoder configured to process run before syntax elements of said serial bitstream, said first intermediate signal comprises a length signal, said second intermediate signal comprises a run before signal and said third intermediate signal comprises a number of zero run befores signal; and a control circuit configured to generate said control signal in response to said plurality of decoded syntax elements, wherein (a) said parsing circuit generates said plurality of decoded syntax elements by grouping said run before syntax elements into one or more groups for atomic decoding such that one or more consecutive zero-valued run before syntax elements are grouped with a non-zero run before syntax element, (b) said run before decoder generates (i) said length signal, (ii) said number of zero run befores signal indicating the number of consecutive zero-valued run before syntax elements in a respective group, and (iii) said run before signal indicating a value of the non-zero run before syntax element for the respective group, and (c) said plurality of decoded syntax elements are generated based upon said length signal, said number of zero run befores signal, and said run before signal.

2. The apparatus according to claim 1, wherein each group comprises either (i) one non-zero run before syntax element or (ii) no non-zero run before syntax elements.

3. The apparatus according to claim 1, wherein said parsing circuit further comprises:
a second decoder configured to generate said decoded syntax elements in response to said first intermediate signal, said second intermediate signal, said third intermediate signal and said parallel bitstream.

4. The apparatus according to claim 1, wherein said first decoder further comprises:
a plurality of length decoder circuits each configured to present one of a plurality of first signals and one of a plurality of a second signals; and
a multiplexer configured to generate said first intermediate signal in response to said plurality of first signals, said length signal and said control signal.

5. The apparatus according to claim 1, wherein said run before decoder comprises:
a logic circuit configured to generate said length signal, said run before signal and said number of zero run befores signal in response to (i) said parallel bitstream and (ii) an accumulated value; and
an accumulator circuit configured to generate said accumulated value in response to said run before signal.

6. The apparatus according to claim 5, wherein said accumulated value comprises a zeros left signal.

7. The apparatus according to claim 5, wherein said logic circuit comprises:
a plurality of context-free decoders, each context free decoder receiving said parallel bitstream and having a number of outputs; and
a multiplexer configured to select between the number of outputs of said plurality of context-free decoders in response to said accumulated value for presentation as said length signal, said run before signal and said number of zero run befores signal.

8. The apparatus according to claim 7, wherein said plurality of context-free decoders comprise H.264/MPEG4-AVC compliant context adaptive VLC tables.

9. The apparatus according to claim 7, wherein said plurality of context-free decoders are implemented as a single look-up table.

10. The apparatus according to claim 1, wherein said decoded syntax elements comprise one or more blocks of coefficients of a video bitstream.

11. The apparatus according to claim 1, wherein said run before syntax elements are located separately from non-zero coefficient syntax elements in said serial bitstream.

12. An apparatus comprising:
means for generating a plurality of decoded syntax elements in response to (i) a serial bitstream and (ii) a control signal, said means for generating said plurality of decoded syntax elements having a first input receiving said serial bitstream, a second input receiving said control signal and an output presenting said plurality of decoded syntax elements, wherein said means for generating a plurality of decoded syntax elements comprises means for generating a parallel bitstream in response to said serial bitstream and a first intermediate signal and means for generating said first intermediate signal, a second intermediate signal, and a third intermediate signal in response to said parallel bitstream and said control signal, wherein said means for generating the intermediate signals includes a means for processing run before syntax elements of said serial bitstream, said first intermediate signal comprises a length signal, said second intermediate signal comprises a run before signal and said third intermediate signal comprises a number of zero run befores signal; and means for generating said control signal in response to said plurality of decoded syntax elements, wherein (a) said plurality of decoded syntax elements are generated by grouping said run before syntax elements into one or more groups for atomic decoding such that one or more consecutive zero-valued run before syntax elements are grouped with a non-zero run before syntax element, (b) said means for processing run before syntax elements generates (i) said length signal, (ii) said number of zero run befores signal indicating the number of consecutive zero-valued run before syntax elements in a respective group, and (iii) said run before signal indicating a value of the non-zero run before syntax element for the respective group, and (c) said plurality of decoded syntax elements are generated based upon said length signal, said number of zero run befores signal, and said run before signal.

13. The apparatus according to claim 12, wherein each group comprises either (i) one non-zero syntax run before element or (ii) no non-zero run before syntax elements.

14. A method for parsing a bitstream comprising:
(A) generating a parallel bitstream in response to a serial bitstream and a first intermediate signal;
(B) using a decoder to generate a plurality of decoded syntax elements in response to (i) said parallel bitstream and (ii) a control signal, wherein said decoder processes run before syntax elements of said serial bitstream and generates said first intermediate signal, a second intermediate signal, and a third intermediate signal in response to said parallel bitstream and said control signal;
(C) generating said control signal in response to said plurality of decoded syntax elements, wherein said plurality of decoded syntax elements are generated by grouping said run before syntax elements into one or more groups for atomic decoding such that one or more consecutive zero-valued run before syntax elements are grouped with a non-zero run before syntax element; and
(D) generating (i) a length signal, (ii) a number of zero run befores signal indicating the number of consecutive zero-valued run before syntax elements in a respective group, and (iii) a run before signal indicating a value of the non-zero run before syntax element in the respective group, wherein, said first intermediate signal comprises said length signal, said second intermediate signal comprises said run before signal, said third intermediate signal comprises said number of zero run before signal, and said plurality of decoded syntax elements are generated based upon said length signal, said number of zero run befores signal, and said run before signal.

15. The method according to claim 14, wherein each group comprises either (i) one non-zero run before syntax element or (ii) no non-zero run before syntax elements.

16. The method according to claim 14, wherein step (A) further comprises the step of:
generating said decoded syntax elements in response to said first intermediate signal, said second intermediate signal, said third intermediate signal, and said parallel bitstream.

17. The method according to claim 14, wherein generating said first intermediate signal, said second intermediate signal, and said third intermediate signal comprises the steps of:

implementing a plurality of length decoder circuits each configured to present one of a plurality of first signals and one of a plurality of second signals;
implementing a run before decoder configured to generate said length signal, said run before signal and said number of zero run befores signal, wherein said run before signal and said plurality of second signals comprise bits of said second intermediate signal; and
implementing a multiplexer configured to generate said first intermediate signal in response to said plurality of first signals, said length signal and said control signal.

18. The method according to claim 17, wherein implementing a run before decoder comprises the steps of:
generating said length signal, said run before signal, and said number of zero run befores signal in response to (i) said parallel bitstream and (ii) an accumulated value; and
generating said accumulated value in response to said run before signal.

* * * * *